US009208753B2

(12) United States Patent
Chan et al.

(10) Patent No.: US 9,208,753 B2
(45) Date of Patent: Dec. 8, 2015

(54) UNAUTHORIZED VIEWER DETECTION SYSTEM AND METHOD

(71) Applicant: Elwha LLC, Bellevue, WA (US)

(72) Inventors: Alistair K. Chan, Bainbridge Island, WA (US); William D. Duncan, Kirkland, WA (US); William Gates, Redmond, WA (US); Daniel A. Gerrity, Seattle, WA (US); Paul Holman, Seattle, WA (US); Roderick A. Hyde, Redmond, WA (US); Edward K. Y. Jung, Las Vegas, NV (US); Jordin T. Kare, Seattle, WA (US); Royce A. Levien, Lexington, MA (US); Richard T. Lord, Tacoma, WA (US); Robert W. Lord, Seattle, WA (US); Mark A. Malamud, Seattle, WA (US); Nathan P. Myhrvold, Bellevue, WA (US); Keith D. Rosema, Olympia, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 9 days.

(21) Appl. No.: 13/711,311

(22) Filed: Dec. 11, 2012

(65) Prior Publication Data

US 2014/0078164 A1    Mar. 20, 2014

Related U.S. Application Data

(63) Continuation-in-part of application No. 13/621,691, filed on Sep. 17, 2012, now Pat. No. 8,600,110.

(51) Int. Cl.
*G06K 9/00* (2006.01)
*G06K 9/62* (2006.01)
*G09G 5/30* (2006.01)

(52) U.S. Cl.
CPC ............ *G09G 5/30* (2013.01); *G06K 9/00228* (2013.01)

(58) Field of Classification Search
CPC ................................. G09G 5/30; G06K 9/78
See application file for complete search history.

(56) References Cited

U.S. PATENT DOCUMENTS 7,131,132 B1 * 10/2006 Gehlot et al. ............... 725/10
7,948,580 B2    5/2011 Sakai et al.
(Continued)

FOREIGN PATENT DOCUMENTS

EP     1 703 431 A2    9/2006
JP     2009-053884     3/2009
(Continued)

OTHER PUBLICATIONS

Lee et al.; "User Authentication Based on Distance Estimation Using Ultrasonic Sensors"; 2008 International Conference on Computational Intelligence and Security; IEEE Computer Society; Jan. 21, 2009; ISBN 978-0-7695-3508-1; pp. 391-394.
(Continued)

*Primary Examiner* — Soo Park
(74) *Attorney, Agent, or Firm* — Foley & Lardner LLP

(57) ABSTRACT

A system for detecting and responding to an intruding camera. The system includes an electronic media display device having a screen configured to display content, a sensor, and a processing circuit. The processing circuit is configured to obtain information from the sensor, analyze the information to determine a presence of a camera, and edit any displayed content in response to the presence of the camera.

46 Claims, 11 Drawing Sheets

(56) References Cited

U.S. PATENT DOCUMENTS

| | | | |
|---|---|---|---|
| 7,995,791 B2* | 8/2011 | Flook et al. | 382/100 |
| 8,184,175 B2* | 5/2012 | Mooradian et al. | 348/222.1 |
| 8,489,887 B1* | 7/2013 | Newman et al. | 713/182 |
| 8,610,787 B2* | 12/2013 | Namba et al. | 348/222.1 |
| 8,854,303 B1* | 10/2014 | Cho et al. | 345/156 |
| 8,913,004 B1* | 12/2014 | Bozarth et al. | 345/156 |
| 8,922,480 B1* | 12/2014 | Freed et al. | 345/156 |
| 8,943,568 B1* | 1/2015 | Hromi et al. | 726/7 |
| 8,963,685 B2* | 2/2015 | Garcia | 340/5.83 |
| 2002/0181780 A1* | 12/2002 | Simon et al. | 382/209 |
| 2005/0086069 A1 | 4/2005 | Watson et al. | |
| 2008/0034435 A1 | 2/2008 | Grabarnik et al. | |
| 2008/0282356 A1 | 11/2008 | Grabarnik et al. | |
| 2009/0138805 A1 | 5/2009 | Hildreth | |
| 2009/0141895 A1 | 6/2009 | Anderson et al. | |
| 2010/0124363 A1 | 5/2010 | Ek et al. | |
| 2010/0205667 A1* | 8/2010 | Anderson et al. | 726/19 |
| 2010/0266162 A1 | 10/2010 | Singh et al. | |
| 2010/0309010 A1 | 12/2010 | Dang | |
| 2011/0316997 A1* | 12/2011 | Shirbabadi | 348/78 |
| 2011/0321143 A1 | 12/2011 | Angaluri et al. | |
| 2012/0038774 A1* | 2/2012 | Reimann et al. | 348/150 |
| 2012/0162433 A1* | 6/2012 | Fuentes Gonzalez | 348/151 |
| 2012/0307066 A1 | 12/2012 | De Ieso | |
| 2012/0328350 A1* | 12/2012 | Taverner | 400/714 |
| 2013/0073087 A1* | 3/2013 | Irmler et al. | 700/259 |
| 2013/0254874 A1* | 9/2013 | Xu | 726/17 |

FOREIGN PATENT DOCUMENTS

| | | |
|---|---|---|
| KR | 2010-0050823 | 5/2010 |
| KR | 2011-0118323 | 10/2011 |
| WO | WO 2009/073584 A1 | 6/2009 |

OTHER PUBLICATIONS

PCT International Search Report; International App. No. PCT/US2013/074028; Mar. 21, 2014; 4 pages.

PCT International Search Report; International App. No. PCT/US2013/059940; Dec. 20, 2013; pp. 1-3.

The EyeFollower, LC Technologies, printed on Dec. 10, 2012, retrieved from internet URL: www.eyegaze.com/products/eye-tracking-research-studies/, 5 pages.

Usability Testing, ERGOSIGN, printed on Dec. 10, 2012, retrieved from internet URL: www.ergosign.de/en/services/usability-testing, 2 pages.

* cited by examiner

UNAUTHORIZED VIEWER DETECTION SYSTEM AND METHOD

CROSS REFERENCE TO RELATED APPLICATIONS

This is a continuation-in-part of application Ser. No. 13/621,691, filed Sep. 17, 2012, titled "Unauthorized Viewer Detection System And Method," which is incorporated by reference herein in its entirety.

BACKGROUND

Many times a person is watching some video or viewing some content on an electronic display device that he does not want others to know he is viewing. However, due to the nature of viewing an electronic display device, he may never know when a collateral viewer is intruding on his content. Because he may not be aware that other persons or devices are looking at his electronic display device, his sensitive content may be viewed by others without his permission. Thus, there is a need for improved systems and methods of detecting intruding viewers of electronic displays and automatically editing content accordingly.

SUMMARY

One exemplary embodiment relates to a system for detecting and responding to an intruding camera. The system includes an electronic media display device having a screen configured to display content, a sensor, and a processing circuit. The processing circuit is configured to obtain information from the sensor, analyze the information to determine a presence of a camera, and edit any displayed content in response to the presence of the camera.

Another exemplary embodiment relates to a method of detecting and responding to an intruding camera. The method includes displaying content on an electronic media display device having a screen, obtaining information from a sensor, analyzing the information to determine a presence of a camera, and editing any displayed content in response to the presence of the camera.

Another exemplary embodiment relates to a non-transitory computer-readable medium having instructions stored thereon. The instructions include instructions for interfacing with an electronic media display device having a screen for visual content, instructions for obtaining information from a sensor, instructions for analyzing the information to determine a presence of a camera, and instructions editing any displayed content in response to the presence of the camera. The information from the sensor corresponds to the environment around the electronic media display device.

Another exemplary embodiment relates to a system for detecting viewers of a display and responding to an intrusion. The system includes an electronic media display device configured to display content, a sensor, and a processing circuit. The processing circuit is configured to obtain information from the sensor, determine a visibility envelope of the electronic media display device, analyze the information from the sensor to determine a presence of an intruder within the visibility envelope, distinguish the intruder from an authorized user, and edit any displayed content.

Another exemplary embodiment relates to a method for detecting intruding viewers of a display and responding to an intrusion. The method includes displaying content on an electronic media display device, obtaining information from a sensor, determining a visibility envelope of the display device, analyzing the information to determine a presence of an intruder within the visibility envelope, distinguishing the intruder from an authorized user, and editing any displayed content.

Another exemplary embodiment relates to a method for detecting intruding viewers of a display of a camera-equipped mobile communication device and responding to an intrusion. The method includes obtaining input from a camera of the mobile communication device, determining an area within which a viewer can resolve any visual content, analyzing the input to determine a presence of an intruder within the area, distinguishing the intruder from an authorized user, and responding to the presence of the intruder by editing the visual content.

Another exemplary embodiment relates to a non-transitory computer-readable medium having instructions stored thereon. The instructions include instructions to interface with an electronic media display device that is configured to display content, instructions to obtain information from a sensor, instructions for determining an area within which a viewer can resolve any visual content, instructions to analyze the information to determine a presence of an intruder within the area, and instructions for editing the visual content if the presence of an intruder is detected.

The invention is capable of other embodiments and of being carried out in various ways. Alternative exemplary embodiments relate to other features and combinations of features as may be generally recited in the claims.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

The invention will become more fully understood from the following detailed description taken in conjunction with the accompanying drawings wherein like reference numerals refer to like elements, in which.

DETAILED DESCRIPTION

Figure 1:
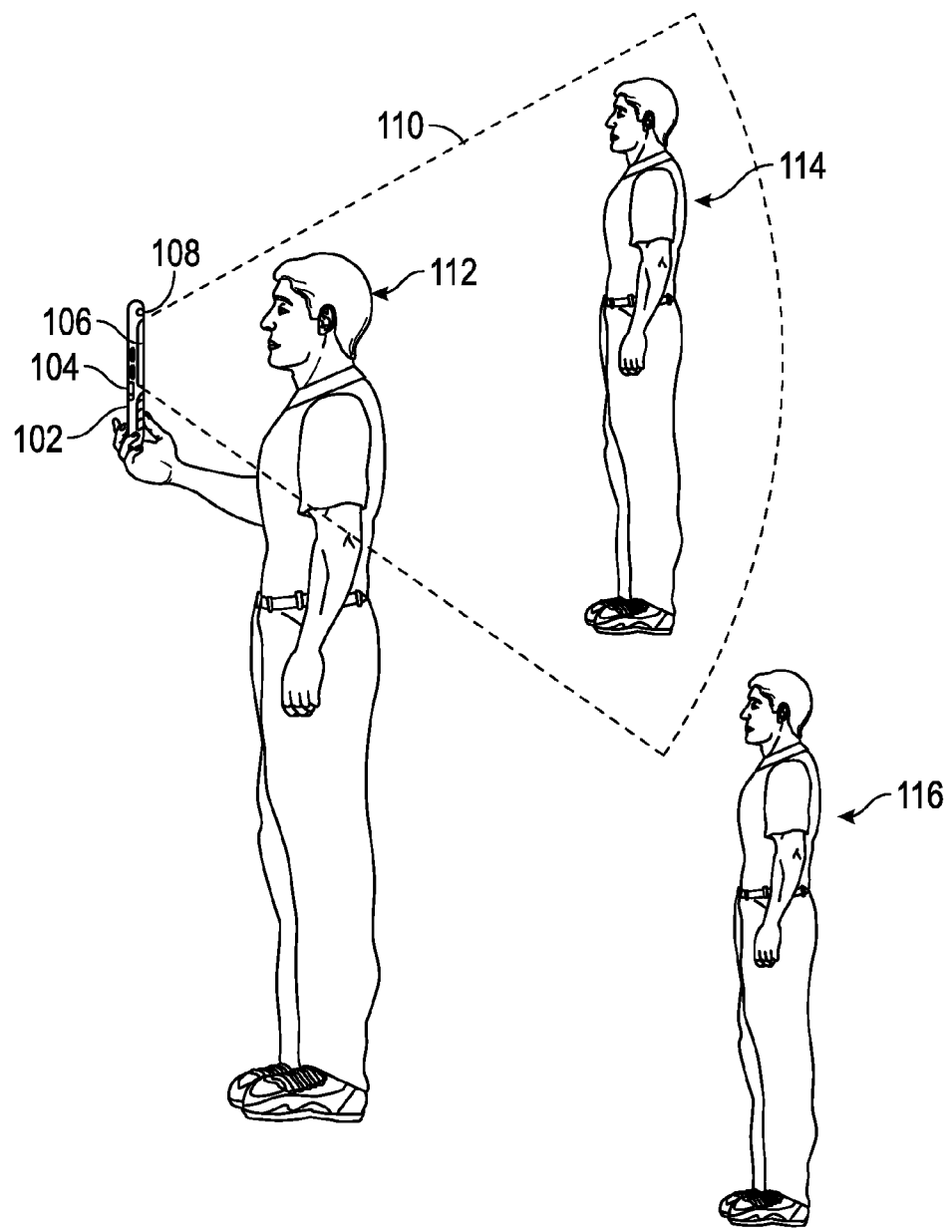
FIG. 1 is a schematic diagram of an electronic media display device and a visibility envelope, shown according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the Figures, systems and methods for detecting intruding viewers of a display and editing content accordingly are shown and described. A person may be operating an electronic media display device (e.g. a cellular phone, a tablet computer, a laptop computer, an eBook reading device, an ATM machine, a music player, a video player, a medical display, or any other device with an electronic display that is displaying content). The electronic media display device may be a fixed device or a mobile device. The person may be viewing sensitive content (e.g. private photographs, private videos, financial records, medical records, or any other content that the person may not want other people to view). A collateral viewer may be behind the person, in a position to view the content, without the knowledge or permission of the person. In another situation the collateral viewer may be holding a still or video camera, and may be using the camera to capture the screen of the electronic media display device. In another situation, a camera may be mounted inconspicuously on an building, or on signage, or a vehicle, etc. Utilizing a sensor (e.g. a camera attached to the device, radar sensor, micropower impulse radar (MIR), light detection and ranging technology, microphone, ultrasonic sensor, infrared sensor, near-infrared (NIR) sensor, or any other sensor that is capable of measuring the range and/or position of objects) the intruder or camera may be detected, and action may be taken to prevent the content from being resolved.

The intruder may be detected by determining a visibility envelope of the electronic media display device, and then performing analysis to determine an intruder's presence and location within the visibility envelope. Use of a visibility envelope can be advantageous in order to distinguish intruders who are capable of viewing and recognizing the contents of the display from ones who are capable of seeing the display but not of actually recognizing content displayed on it. By making this distinction, the display can take protective action (e.g., editing or modifying the display contents) only when necessary to prevent content being recognized, and not for the case of intruders who are not within the visibility envelope of the display and do not pose a significant threat to the privacy of the displayed content. This reduction in the use of protective action can reduce the inconvenience to the user and disruption of the user's viewing activities that universal protective actions would entail. The intruder's presence may be based in part on his distance from the electronic media display device. The visibility envelope may be generated by a processing circuit, which accepts information from a sensor. The information may be of the electronic media display device's surroundings. The processing circuit may use the information to determine the presence of an intruder within the visibility envelope based on the distance and viewing angle of the intruder. The processing circuit may perform an analysis of the distance and viewing angle of the intruder and determine whether action needs to be taken to edit or change the content that the electronic media display device is displaying. According to an alternative embodiment, in determining the presence of the intruder, the processing circuit may also perform red eye detection analysis, resolution analysis, and display brightness analysis.

The camera may be detected by performing analysis to determine a camera's presence and location within the area around the electronic media display device. Because an intruding camera may be able to detect the screen contents at distances and angles greater than that of human eyesight (e.g., with a zooming lens, a telephoto lens, etc.), the use of a visibility envelope as described above may not always be desirable. In some embodiments, the visibility envelope features may be enable and disabled as desired by a user, or as necessary for different types of unauthorized viewer detection (e.g., human intruders, intruding cameras and devices, etc.). Ranges and angles may still be specified to limit an area in which protective action is taken, and thereby reduce the inconvenience to the user and reduce disruption of the user's viewing activities. The sensor may provide information to the processing circuit corresponding to the electronic media display device's surroundings. The processing circuit may use the information to determine the presence of an intruding camera. The processing circuit may perform an analysis of the distance and viewing angle of the intruder and determine whether action needs to be taken to edit or change the content that the electronic media display device is displaying. The processing circuit may also be configured to take action whenever an intruding camera is detected, regardless of distance or viewing angle.

The system may be enabled or disabled by a user as the user desires. The threshold of when and what action should be taken may be specified by a preference file or by default values. The actions may include editing or changing of the content (e.g. turning off the display, switching the content to another content, degrading the visibility of the content, warning the user with an alert, or any other editing of the content).

For purposes of this disclosure, the term "coupled" means the joining of two members directly or indirectly to one another. Such joining may be stationary in nature or moveable in nature and such joining may allow for the flow of electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring to FIG. 1, a visibility envelope 110 is shown. Visibility envelope 110 is generated by mobile device 102 having a sensor 108, electronic media display 106, and processing circuit 104. Sensor 108 may be a camera, or other appropriate sensor. Electronic media display 106 may be an LCD screen, an e-Paper screen, or any other electronic media display capable of displaying content. Mobile device 102 is shown as a cellular phone, but it may be a tablet computer, a portable movie player, or other mobile devices. The systems and methods of the present disclosure are not limited based on the type of mobile device, the type of the sensor, type of electronic media display, or the type of processing circuit.

User 112 is shown as operating mobile device 102. Electronic media display 106 may be showing textual content, video content, photographical content, or any other type of electronic content. The systems and methods of the present disclosure are not limited based on the type of electronic content being displayed.

Visibility envelope 110 is shown as being generated for a certain range. Viewer 116 and intruder 114 are shown. Viewer 116 is depicted as being too far away from the electronic media display 106 to resolve the content on the screen thereof, and thus outside of visibility envelope 110. Intruder 114 is depicted as being within visibility envelope 110. The systems and methods of the present disclosure are not limited based on the number or position of viewers and intruders. As an example, an intruder may be within the visibility envelope, and thus any content being displayed by electronic media display 106 may be removed or edited to stop the intruder from viewing the content. However, in the same example, another viewer may be too far out of range, and not within the visibility envelope. The system may not react to the presence of the out of range viewer.

Figure 2:
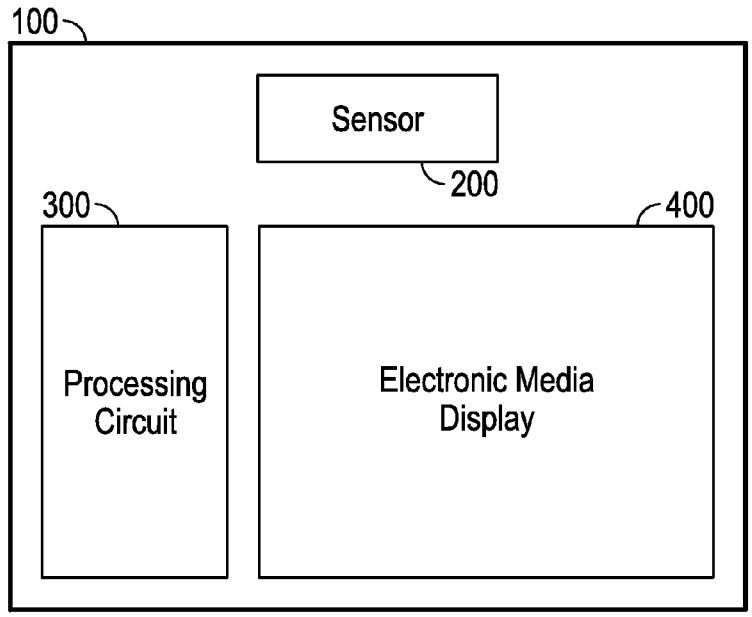
FIG. 2 is a block diagram of an electronic media display device, a sensor, and a processing circuit, shown according to an exemplary embodiment.

Referring to FIG. 2, a block diagram of a system 100 for executing the systems and methods of the present disclosure is shown. System 100 includes sensor 200 for detecting information about the environment around system 100. The information that sensor 200 detects may be provided to processing circuit 300. Processing circuit 300 may process the information, generate a visibility envelope, use the processed information to determine the location and threat of any intruding viewers within the visibility envelope, and make a determination of whether or not to edit content on electronic media display 400. Sensor 200 may be coupled to electronic media display 400, and processing circuit 300 may be coupled to electronic media display 400. While depicted as separate modules in FIG. 2, sensor 200, processing circuit 300, and electronic media display 400 may be part of one device. For example, sensor 200 may be the camera of a camera-equipped cellular phone, processing circuit 300 may be the processor or a separate module within the cellular phone, and electronic media display 400 may be the display of the cellular phone. As another example, sensor 200 may be the camera of a camera-equipped laptop, processing circuit 300 may be the processor within the laptop, and electronic media display 400 may be the LCD display of the laptop.

Figure 3:
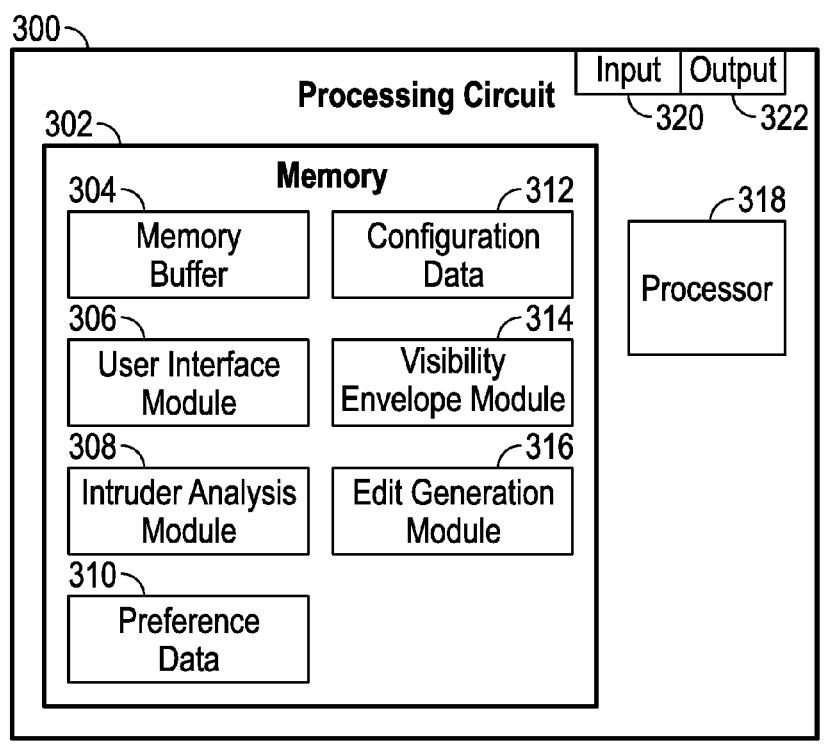
FIG. 3 is a detailed block diagram of a processing circuit, shown according to an exemplary embodiment.

Referring now to FIG. 3, a more detailed block diagram of processing circuit 300 for completing the systems and methods of the present disclosure is shown, according to an exemplary embodiment. Processing circuit 300 may be processing circuit 104 of FIG. 1. Processing circuit 300 is generally configured to accept input from an outside source (e.g. a sensor, a camera, etc.) in addition to other information (e.g. configuration data, preference data files, etc.). Input may be accepted continuously or periodically. In one embodiment, processing circuit 300 is then configured to use the accepted information to analyze information related to the environment, determine a visibility envelope, analyze the visibility envelope and determine intruders, determine if any content should be edited, and control the editing of content. In another embodiment, processing circuit is configured to use the accepted information to analyze information related to the environment, analyze information and determine the presence of cameras, determine if any content should be edited, and control the editing of content. It is envisioned that a device implementing the systems and methods disclosed herein may utilize either configuration (i.e., enabling or disabling visibility envelope features per a configuration file, user preferences, or based on location or time, etc.). As an example, a device may first scan for intruding viewers using a visibility envelope and then perform a subsequent scan for intruding cameras without using a visibility envelope. In another example, a device may provided GPS coordinates to processing circuit 300, and processing circuit may enable or disable visibility envelope features based on where a user is presently located. Settings stored within configuration data 312 or preference data 310 may be used to control visibility envelope activation. In one embodiment, a device implementing the systems and methods herein may perform a scan for both intruding viewers and intruding cameras simultaneously.

Processing circuit 300 includes processor 318. Processor 318 may be implemented as a general purpose processor, an application specific integrated circuit (ASIC), one or more field programmable gate arrays (FPGAs), a group of processing components, or other suitable electronic processing components. Processing circuit 300 also includes memory 302. Memory 302 is one or more devices (e.g., RAM, ROM, Flash Memory, hard disk storage, etc.) for storing data and/or computer code for facilitating the various processes described herein. Memory 302 may be or include non-transient volatile memory or non-volatile memory. Memory 302 may include database components, object code components, script components, or any other type of information structure for supporting the various activities and information structures described herein. Memory 302 may be communicably connected to the processor 318 and include computer code or instructions for executing the processes described herein (e.g., the processes shown in FIGS. 9-13).

Memory 302 includes memory buffer 304. Memory buffer 304 is configured to receive data from a sensor, (e.g. sensor 200) through input 320. The sensor data may include image or video data, or radar information, light detection and ranging information, infrared information, sonic or ultrasonic information, or content information (e.g., content information related to electronic media display 400). The image or video data, for example, may be photographs taken by sensor 108. The data receive through input 320 may be stored in memory buffer 304 until memory buffer 304 is accessed for data by the various modules of memory 302. For example, the visibility envelope module may access the image or video data that is stored in memory buffer 304.

The memory 302 further includes configuration data 312. Configuration data 312 includes data relating to processing circuit 300. For example, configuration data 312 may include information relating to interfacing with an electronic media display. This may include the command set needed to interface with graphic display components, for example a graphics processing unit (GPU). As another example, the configuration data 312 may include information as to how often input should be accepted from sensor 200 and how often the environment should be scanned for intruders or cameras. As another example, configuration data 312 may include data to configure the communication between the various components of processing circuit 300.

Memory 302 further includes user interface module 306. User interface module 306 is configured to receive input data through input 320. User interface module 306 is further configured to interpret the data for the other modules of processing circuit 300. For example, user interface module 306 may receive a cancel request, wherein a user requests an end to editing of the content, and user interface module 306 may be configured to receive that request and provide appropriate commands to edit generation module 316 to cease editing. User interface module 306 may also generate a user interface to allow a user to control edit generation module 316, as well as edit preference data 310. As another example, the user interface module may receive a request to begin scanning for intruders, and user interface module 306 may be configured to use that request and provide appropriate commands to enable the system.

Memory 302 further includes modules 308, 310, 314, and 316, for executing the systems and methods described herein. Modules 308, 310, 314, and 316 are configured to receive image and video data, sensor information, radar information, light detection and range information, infrared information, sonic or ultrasonic information, preference data, and other data as provided by processing circuit 300. Modules 308, 310, 314, and 316 are configured to analyze the data, optionally generate a visibility envelope, determine viewers and their characteristics (range, location, etc.), determine whether intruders are present within the visibility envelope limits, use the data to determine if cameras are present within the area around the display, and determine whether to edit content on an electronic media display.

Visibility envelope module 314 is configured to receive range and angle information. The information may be provided by configuration data 312, or by preference data 310. Visibility envelope module 314 is configured to interpret the range and angle information and determine a visibility envelope based on the information. The visibility envelope may be a representation of a danger zone of the device. For example, any person(s) within the visibility envelope may be classified as intruders, and may have the potential of being able to resolve content of electronic media display 300. Visibility envelope module 314 may be enable or disabled depending on the type of scan being performed. For example, when intruding viewers are to be detected, visibility envelope module 314 may be enabled. In another example, when intruding cameras are to be detected, visibility envelope module 314 may be disabled and bypassed. In practice, intruder analysis module 308 may choose to either utilize or not utilize the generated visibility envelope depending on what type of intrusion (e.g., human, camera, etc.) is to be detected. Such a configuration allows for simultaneous detection of human intruders and camera intruders using a single source data set, where one set of constraints (e.g. the visibility envelope) is applied when generating detection information related to human intruders, and another set of constraints (e.g., bypassing visibility the envelope) when generating detection information related to cameras. In one embodiment that is directed solely toward detecting intruding camera, visibility envelope module 314 may be absent from processing circuit 300.

In an exemplary embodiment, visibility envelope module 314 receives from configuration data 312 a range $R_{m1}$ and a viewing angle $\theta_{m1}$. Range $R_{m1}$ represents a maximum range over which an electronic media display (e.g. electronic media display 400) may be viewed such that the electronic media display's contents may be resolved. Viewing angle $\theta_{m1}$ represents a maximum angle over which an electronic media display (e.g. electronic media display 400) may be viewed such that the electronic media display's contents may be resolved. Range $R_{m1}$ and viewing angle $\theta_{m1}$ may correspond to the specifications of the electronic media display. Visibility envelope module 314 may provide the visibility envelope information $R_{m1}$ and $\theta_{m1}$ to intruder analysis module 308. While the discussion of the visibility envelope herein is generally in terms of independent bounds on range, $R_{m1}$, and viewing angle, $\theta_{m1}$, in some embodiments, the visibility envelope can be given by a functional relationship, such as $R_{m1}(\theta_{m1})$, in which the range is a function of the viewing angle, $\theta_{m1}$. For instance, $R_{m1}$ can be larger for $\theta_{m1}=0$, than for $\theta_{m1}=20°$. In some embodiments, the visibility envelope depends on a two dimensional viewing angle (e.g., on azimuth and elevation) relative to the display's axes, not simply on the polar angle from the display's normal vector, $\theta_{m1}$.

In another exemplary embodiment, visibility envelope module 314 receives from preference data 310 a range $R_{m2}$ and a viewing angle $\theta_{m2}$. The viewing angle $R_{m2}$ represents a maximum range specified by a user for analysis. The viewing angle $\theta_{m2}$ represents a maximum angle specified by a user for analysis. For example, a user may not be concerned about any viewers more than a certain angle to the side of his device, and can specify as such in the preferences. As another example, a user may not be concerned about viewers who are greater than a certain distance away from the device, and can specify as such in the preferences. Visibility envelope module 314 may provide the visibility envelope information $R_{m2}$ and $\theta_{m2}$ to intruder analysis module 308.

In one embodiment, visibility envelope module 314 receives from configuration data 312 a range $R_{m3}$ and a viewing angle $\theta_{m3}$. Range $R_{m3}$ represents a maximum range over which an electronic media display (e.g. electronic media display 400) may be viewed such that the electronic media display's contents may be resolved. Viewing angle $\theta_{m3}$ represents a maximum angle over which an electronic media display (e.g. electronic media display 400) may be viewed such that the electronic media display's contents may be resolved. Additionally, visibility envelope module 314 receives a brightness level B of the electronic media display's brightness level. Visibility envelope module 314 then adjusts $R_{m3}$ and $\theta_{m3}$ according to brightness B. For example, if the electronic media display's brightness is at a maximum level, $R_{m3}$ and $\theta_{m3}$ may be increased, and if the electronic media display's brightness is at a minimum level, $R_{m3}$ and $\theta_{m3}$ may be decreased. Additionally, visibility envelope module 314 receives a brightness level $B_a$ of the ambient environment's brightness level and/or its polarization. Visibility envelope module 314 then adjusts $R_{m3}$ and $\theta_{m3}$ according to brightness $B_a$. For example, if the ambient brightness is at a maximum level, $R_{m3}$ and $\theta_{m3}$ may be decreased, and if the ambient brightness is at a minimum level, $R_{m3}$ and $\theta_{m3}$ may be increased. Visibility envelope module 314 may provide the adjusted visibility envelope information $R_{m3'}$ and $\theta_{m3'}$ to intruder analysis module 308.

In one embodiment, visibility envelope module 314 receives from configuration data 312 a range $R_{m4}$ and a viewing angle $\theta_{m4}$. Range $R_{m4}$ represents a maximum range over which an electronic media display (e.g. electronic media display 400) may be viewed such that the electronic media display's contents may be resolved. Viewing angle $\theta_{m4}$ represents a maximum angle over which an electronic media display (e.g. electronic media display 400) may be viewed such that the electronic media display's contents may be resolved. Additionally, visibility envelope module 314 receives a content type description of the primary content type that is being displayed on the electronic media display. Visibility envelope module 314 then adjusts $R_{m4}$ and $\theta_{m4}$ according to the content type. For example, if the content type is photographical content, $R_{m4}$ and $\theta_{m4}$ may be increased. If the content type is textual content, $R_{m4}$ and $\theta_{m4}$ may be decreased. Visibility envelope module 314 may provide the adjusted visibility envelope information $R_{m4'}$ and $\theta_{m4'}$ to intruder analysis module 308.

Intruder analysis module 308 receives visibility envelope information from visibility envelope module 314, and intruder analysis module 308 receives a user preference file from preference data 310. Additionally, intruder analysis module 308 receives sensor information, which is provided by the sensor (e.g. sensor 200) through input 320. In an embodiment that utilizes the visibility envelope features described herein, intruder analysis module 308 uses the received visibility enveloped information in performing its analysis. Intruder analysis module 308 scans the input for viewers, and classifies them as either intruders or safe viewers. Intruder analysis module 308 also scans the input for cameras or camera-equipped devices (e.g., SLR cameras, camera-equipped cellular phones, point-and-shoot cameras, building-mounted camera systems, etc.). Intruder analysis module 308 may classify an object as a viewer or camera using any number of detection algorithms. For example, intruder analysis module 308 may apply motion detection algorithms on the sensor information, and may classify any moving object as a viewer. As another example, intruder analysis module 308 may apply shape detection algorithms that scans the sensor information for lens (e.g., circular) shapes. As another example, intruder analysis module 308 may apply shape detection algorithms that scans the sensor information to determine whether a detected camera has a lens cap emplaced; in this case it may not be considered as an intruder. As another example, intruder analysis module 308 may apply shape detection algorithms that scans the sensor information to determine the orientation of a detected camera. The camera's orientation may include an angle between the camera's imaging direction and a line of sight from the camera to the electronic media display device. The camera's status as an intruder may be based on whether or not it is pointing towards the electronic media display device. As another example, intruder analysis module 308 may apply facial recognition algorithms on the sensor information, and may classify any detected faces as viewers. As another example, intruder analysis module 308 may compare an object to a database of camera specification information, and may implement pattern matching algorithms using the object's dimensions or characteristics.

Intruder analysis module 308 analyzes any detected viewers to determine each viewer's range and location information. A viewer's range and location information may be determined by any number of range-finding and location-finding algorithms. The systems and methods of the present disclosure are not limited based on the type of range-finding and location-finding algorithms. Intruder analysis module 308 may compare a viewer's range and location to the bounds of the visibility envelope. For example, if a viewer's range is greater than the visibility envelope's range, intruder analysis module 308 may not classify the viewer as an intruder. As another example, if a viewer's location is such that the viewer has a viewing angle greater than the visibility envelope's maximum viewing angle, intruder analysis module 308 may not classify the viewer as an intruder. As another example, if a viewer is located 20 ft. from the display device, and the visibility envelope has a maximum range of 15 ft., the viewer would not be classified as an intruder. For viewers that are within the bounds of the visibility envelope, intruder analysis module 308 may perform additional analysis as discussed below.

Intruder analysis module 308 may use any number of algorithms to determine that the user is not an intruder. As a simple example, intruder analysis module 308 may classify the closest viewer as a safe user. As another example, intruder analysis module 308 may classify a partially obscured viewer as an intruder. As another example, intruder analysis module 308 may determine demographics of the viewer (e.g., age, sex, race) and compare these to those of safe user demographics as specified by a user preferences file to classify the viewer as either a safe user or as an intruder; for instance all children within the visibility envelope may be classified as intruders. As another example, intruder analysis module 308 may apply additional facial recognition algorithms on any detected viewers. Intruder analysis module 308 may compare a detected viewer's face to a set of safe user faces as specified by a user preferences file (e.g. preference data 310). Intruder analysis module 308 may then determine whether the detected viewer has a face that is within the set of safe user faces, if so, intruder analysis module 308 may not classify that viewer as an intruder. Intruder analysis module 308 may further use algorithms to detect the eye-state or red-eye response of a viewer. Intruder analysis module 308 may use the eye information to restrict classifying a viewer with closed eyes as an intruder. Intruder analysis module 308 may then provide the results of the analysis to edit generation module 316.

Intruder analysis module 308 analyzes any detected cameras to determine each camera's range and location information. A camera's range and location information may be determined by any number of range-finding and location-finding algorithms. The systems and methods of the present disclosure are not limited based on the type of range-finding and location-finding algorithms. Intruder analysis module 308 may compare a camera's range and location to the bounds stored within a preferences file (e.g., configuration data 312, preference data 310) or compare a camera's range and location data to default values. For example, if a camera's range is greater than the maximum range, intruder analysis module 308 may not consider a camera as an intruder. As another example, if a camera's location is such that the camera it at an angle greater than a specified maximum viewing angle, intruder analysis module 308 may not classify the camera as an intruder. Intruder analysis module 308 provides the results of this analysis to edit generation module 316.

In one embodiment, intruder analysis module 308 may receive input via input 320 from a sensor that is a single camera. The input may be of image information, and may include the camera's focal length for the particular image. Intruder analysis module 308 may also receive information from configuration data 312 of the camera's specifications. Intruder analysis module 308 may detect viewers as discussed above, and then determine a viewer's range based on the angular size of the intruder (or portions thereof). For example, the size of some portions of the human body (e.g., facial width, or eye-to-eye separation) are relatively constant for most people. Accordingly, a priori knowledge of this physical size, combined with the angular size as measured by a camera, allows intruder analysis module 308 to infer a range estimate. Intruder analysis module 308 may detect viewers as discussed above, and then determine a viewer's range based on focusing algorithms. For example, intruder analysis module 308 may use the focal length necessary for focus in conjunction with the camera's specifications to calculate a distance. As another example, intruder analysis module may use contrast detection and phase detection algorithms to focus the image. Intruder analysis module 308 may use the calculated distance and the image information to determine a viewing angle of a viewer. Intruder analysis module 308 may then use the calculated distance and viewing angle in analyzing the viewer as discussed above. As another example, intruder analysis module 308 may use the ability of the camera to resolve features of the viewer in order to infer the ability of the viewer to resolve visual contents displayed on the screen, i.e., if the camera cannot clearly resolve the viewer, the intruder analysis module 308 may assume the converse, and not classify him as an intruder. This analysis may involve a priori knowledge of typical human visual acuity (which may be dependant upon the ambient lighting conditions) as well as the imaging resolution capabilities of the camera and the quality of the image it obtains of the viewer.

In one embodiment, intruder analysis module 308 receives input via input 320 from a sensor that contains two cameras. The input may be of image or video information. Intruder analysis module 308 may also receive camera specification information from configuration data 312. Using the two camera input, intruder analysis module 308 may use stereoscopic algorithms to calculate the range of a viewer. Intruder analysis module 308 may use the calculated range and the image or video information to determine a viewing angle of a viewer. Intruder analysis module 308 may use the calculated range and viewing angle in analyzing the viewer as discussed above.

In one embodiment, intruder analysis module 308 may receive input via input 320 from a sensor that contains a camera and distance measuring device (e.g., a sonic or ultrasonic device, a microphone, an infrared device, a micropower impulse radar device, a light detection and ranging device etc.) The input may be of image or video information and distance information. Intruder analysis module 308 may also receive camera specification information from configuration data 312. Intruder analysis module 308 may use the distance information to determine a range of a viewer. Intruder analysis module 308 may then use the range and the image or video information to determine a viewing angle of a viewer. Intruder analysis module 308 may use the range and viewing angle in analyzing the viewer as discussed above.

In one embodiment, intruder analysis module 308 may receive content information, in addition to input from a sensor. The content information may be of a content type that is being primarily displayed. For example, a content type may be of "text" or "video." Intruder analysis module may use the content type information in addition to analyzing the viewer as discussed above. For example, if the content being displayed on an electronic media display is text of a small font, the range in which a viewer is considered an intruder may be decreased due to the difficulty of reading small text at a distance. As another example, if the content being displayed is an image, the range in which a viewer is considered an intruder may be increased due to the ease of viewing an image.

Edit generation module 316 is configured to receive data from intruder analysis module 308. Edit generation module 316 is further configured to provide communication capabilities with an electronic media display via input 320 and output 322. The data may include results from any analysis performed by intruder analysis module 308. Edit generation module 316 may determine whether to perform edits to content on an electronic media display (e.g., electronic media display 400). For example, the data may indicate the presence of intruders (e.g., intruding viewers, intruding cameras), and edit generation module 316 may then determine that content must be edited. Edit generation module 316 may accept information corresponding to the contents displayed on an electronic media display. Edit generation module may then provide the commands for editing the content and transmit the commands via output 322.

As an example, edit generation module 316 may provide commands to degrade the visibility of the electronic media display content (e.g. blurring the content of the electronic media display, dimming the brightness of the content of the electronic media display, reducing the font size of the content of the electronic media display, switching the content of the electronic media display to a new content, stopping (or refusing to start) the display of the content of the electronic media display device, etc.) As another example, edit generation module 316 may provide commands necessary for warning the user with an alert message, by playing an alert sound, or by muting the sound. As another example, the alert may involve haptic feedback (e.g., a vibration), or visual alert indication (e.g., flashes, color changes). As another example, the data from intruder analysis module 308 may indicate the lack of any intruders, and edit generation module 316 may then determine that the content should be displayed unedited and may not send any commands to edit content, or may send commands to cease any editing that is occurring.

In one embodiment, edit generation module 316 may generate commands to switch content displayed on an electronic media display (e.g., electronic media display 400) to new content in real time. For example, electronic media display 400 may be the display of a cellular phone, and a user may be watching a film that is not appropriate for children on the cellular phone. A child may walk up behind the display, and edit generation module 316 may send commands to switch the film to a blank stream of white frames with no audio. In another example edit generation module 316 may send commands to pause the film and blur the display. In another example edit generation module 316 may send commands to pause the film and dim the brightness of the display.

Figure 4:
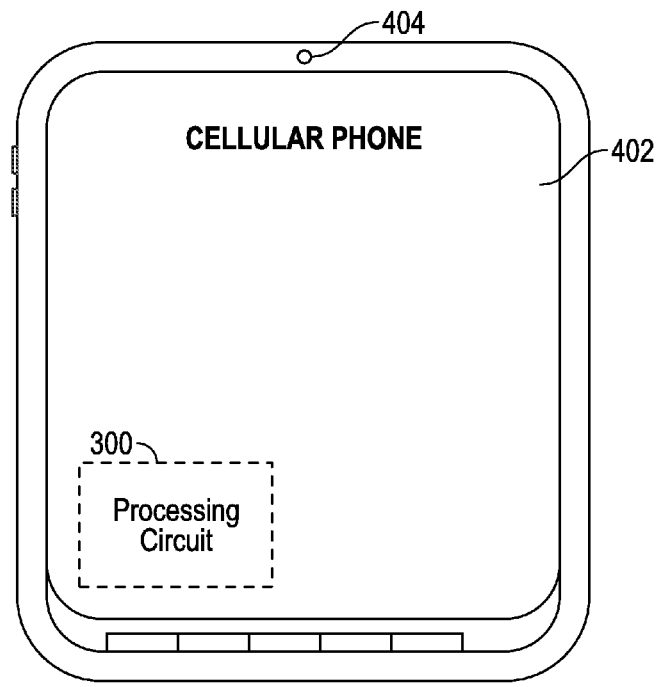
FIG. 4 is a schematic diagram of an electronic media display device, a sensor, and a processing circuit, shown according to an exemplary embodiment.

In one embodiment, edit generation module 316 may generate commands to mute the audio of an electronic media display device (e.g., electronic media display device 402 of FIG. 4). For example, electronic media display device 402 may be a camera equipped cellular phone, and a user may be making a video call with speakerphone enabled. An intruder may walk up behind the device, and edit generation module 316 may produce commands to mute the audio output of the cellular phone. In this fashion, the audio of the video call would be muted before the intruder can actively hear the discussion.

In an alternative embodiment, edit generation module 316 may generate commands to freeze the current content displayed on an electronic media display (e.g., electronic media display 400). This may be useful as part of a parental control system. For example, electronic media display 400 may be the display of a laptop computer, and a parent may set the user preferences to freeze the screen if an intruder is detected. The parent may have not added his or her face to a list of safe users. The parent may walk up behind the display when the display is being used by a child, and edit generation module 316 may send commands to freeze the contents of the display. In this fashion, the parent may see what the child was viewing before the child can actively change the content.

Preference data 310 may be stored in a database local to or remotely from processing circuit 300, or may be received via a preference file transmitted to processing circuit 300 via input 320. Preference data 310 relates to user preferences for the visibility envelope module 314, intruder analysis module 308, and edit generation module 316. Using a preference file stored in preference data 310, the constraints of a visibility envelope may be customized for a user. Additionally, a safe user may be specified for use in determining an intruder. A user's preferred content editing methods (e.g. blurring the screen, etc.) may also be specified and stored in the preference file. For example, if a user is in a particularly sensitive environment, the user may increase the range in which a viewer is considered an intruder.

Processing circuit 300 further includes an input 320 and an output 322. Input 320 may be configured to receive image information, video information, content information, preference file information, and other information relating to the determination of a visibility envelope, performing intruder analysis, and editing content as described above. Output 322 may be configured to provide an output to a client, electronic display, or other electronic device as described above. Outputs may include commands, data including image sequences, preference file information, and other information related to editing content as described above. Outputs may involve recording the time and/or location of an intrusion event, an image of the intruder, the position of the intruder relative to the device, the determination of the viewer as either a safe viewer or as an intruder, the editing action taken, or other information related to the event.

Referring generally to FIGS. 4-14, various schematic diagrams and processes are shown and described that may be implemented using the systems and methods described herein. The schematic diagrams and processes may be implemented using the system 100 of FIG. 2 and processing circuit 300 of FIG. 3.

Referring to FIG. 4, a schematic diagram of an electronic media display device, a sensor, and a processing circuit is shown according to one embodiment. Electronic media display device 402 is shown as camera-equipped cellular phone. Sensor 404 is shown as a camera that is coupled to electronic media display device 402. Processing circuit 300 is shown as internal processing components. Processing circuit 300 contains modules and components as describe above. While FIG. 4 only shows one camera as a sensor, it should be understood that sensor 402 may be any of the sensors discussed above. Coupling sensor 402 and processing circuit to electronic media display device 402 allows for portability of the system.

As an exemplary embodiment, electronic media display device 402 may be a tablet computing device. Sensor 404 may be an onboard camera that is coupled to the tablet computer. Processing circuit 300 may be the processing components of the tablet computer that are configured to implement the systems and methods described herein.

Figure 5:
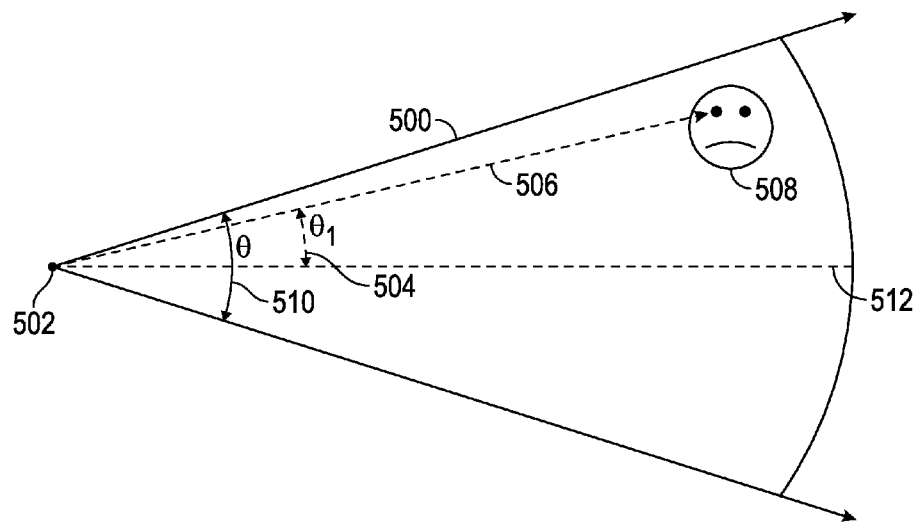
FIG. 5 is a schematic diagram of a visibility envelope, shown according to an exemplary embodiment.

Referring to FIG. 5, a schematic diagram of a sensor 502 and corresponding visibility envelope 500 is shown. Analysis performed by intruder analysis module 308 of processing circuit 300 is depicted as angle 504 and distance 506. An intruder 508, maximum viewing angle 510, and maximum viewing range 512 are also depicted. According to an exemplary embodiment, angle 510 and range 512 may correspond to the specifications of an electronic media display device. For example, a particular mobile LCD display may have a maximum viewing angle of 160° and a maximum resolvable viewing distance of 15 ft. According to an alternative embodiment, angle 510 and range 512 may be offset with values as specified by a user preferences file. According to an exemplary embodiment, angle 504 is be calculated as the angle between a center axis and the position of a viewer 508. The center axis may be positioned midway within the maximum viewing angle.

Figure 6:
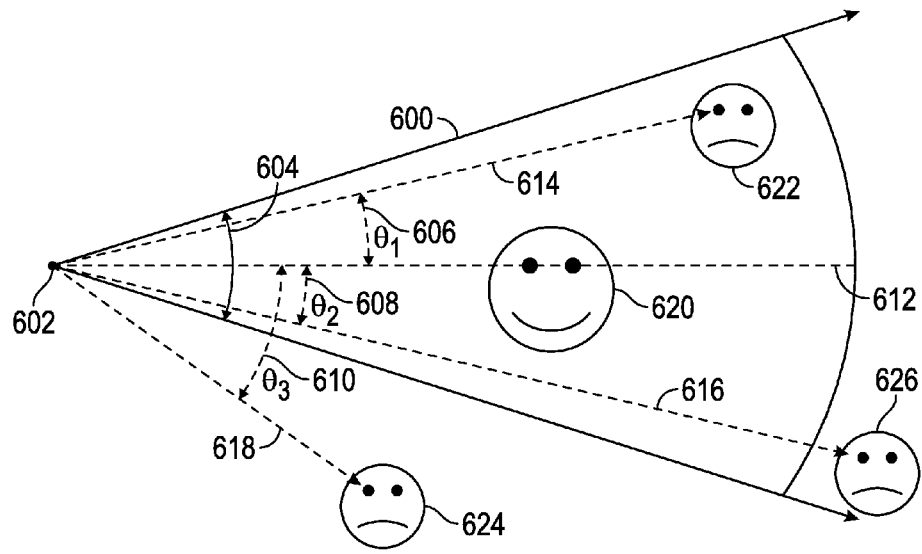
FIG. 6 is a schematic diagram of a visibility envelope, shown according to an exemplary embodiment.

Referring to FIG. 6, a schematic diagram of a sensor 602 and corresponding visibility envelope 600 is shown. Analysis performed by intruder analysis module 308 of processing circuit 300 is depicted as angles 606, 608, and 610, and distances 614, 616, and 618. User 620, viewers 622, 624 and 626, maximum viewing angle 604, and maximum viewing range 612 are also depicted. According to an exemplary embodiment, angle 604 and range 612 correspond to the specifications of an electronic media display device. According to an alternative embodiment, angle 604 and range 612 may be offset with values as specified by a user preferences file. As shown in FIG. 6, viewer 626 is shown as having a range 616 that is greater than the maximum resolvable viewing range 612. For example, viewer 626 may be positioned 25 ft. from sensor 602, which is coupled to an electronic media display that has a maximum viewing range of 15 ft. In this example, viewer 626 would not be considered an intruder. Similarly, viewer 624 may be positioned at an angle that is greater than half of the display's maximum viewing angle. Viewer 624 would not be considered an intruder. However, viewer 622 is a positioned at a range that is less than maximum viewing range 612, and at an angle that is less than half of the maximum viewing angle 612. Viewer 622 would be considered an intruder.

Figure 7:
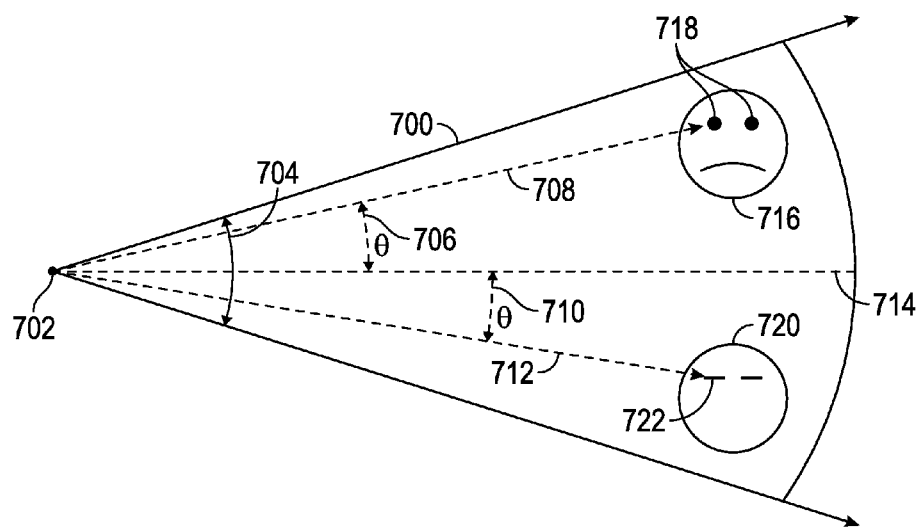
FIG. 7 is a schematic diagram of a visibility envelope, shown according to an alternative embodiment.

Referring to FIG. 7, a schematic diagram of a sensor 702 and corresponding visibility envelope 700 is shown. Analysis performed by intruder analysis module 308 of processing circuit 300 (as is shown in FIG. 3) is depicted as angles 706, and 710, and distances 708 and 712. Additionally, analysis related to eye detection is also depicted at 718. Viewers 716 and 720, maximum viewing angle 704 and maximum viewing range 714 are also depicted. According to an exemplary embodiment, angle 704 and range 714 correspond to the specifications of an electronic media display device. Both viewers 716 and 720 are shown as within viewing envelope 700. However, viewer 720 has his or her eyes 722 closed, or may be turned around looking the other way. For example, a viewer may be sleeping. Viewer 716 has his or her eyes 718 open. In an alternative embodiment, an intruder analysis module such as intruder analysis module 308 may use this information in determining if a viewer is an intruder. For example, if a red eye response cannot be determined for a viewer, that viewer may not be classified as an intruder. As shown in FIG. 7, viewer 716 would be classified as an intruder, but viewer 720 would not. As an example, algorithms that may be used to detect open eyes include red-eye response algorithms, and other facial recognition algorithms.

Figure 8:
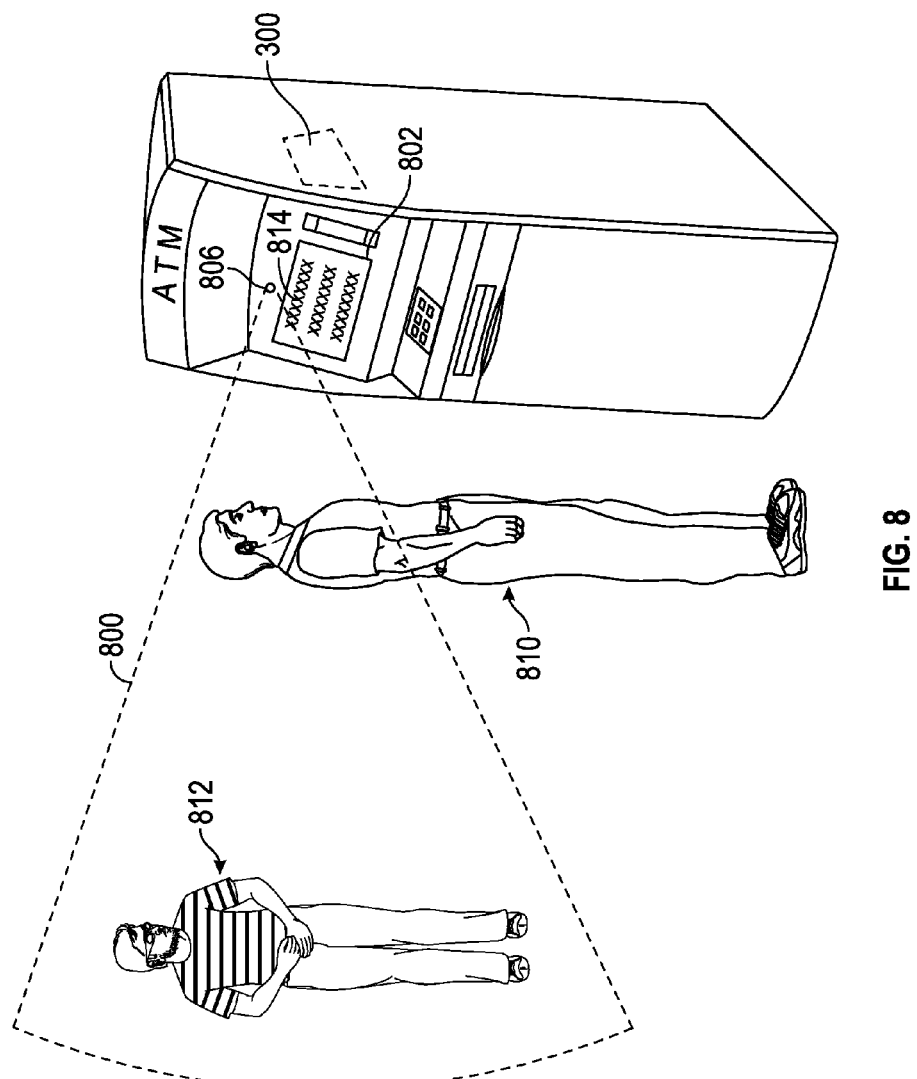
FIG. 8 is a schematic diagram of an electronic media display device, a sensor, a processing circuit, and a visibility envelope, shown according to an alternative embodiment.

Referring to FIG. 8, a schematic diagram of shows electronic media display device 802, sensor 806, processing circuit 300 (as is shown in FIG. 3), and visibility envelope 800. According to an exemplary embodiment, the electronic media display device is part of an ATM machine. Sensor 806 may be a camera that is coupled to the ATM machine, and processing circuit 300 may be the processing components of the ATM machine. User 810 is shown as operating the ATM machine, and viewer 812 is shown as being within visibility envelope 800. Contents of electronic media display device 802 are shown as blurred 814. By automatically blurring the contents of the display, sensitive content can be protected from being viewed by unauthorized viewers. Similar embodiments are also useful in situations where sensitive content is displayed. For example, a medical display device that displays or gathers information about a user's medical history.

Figure 9:
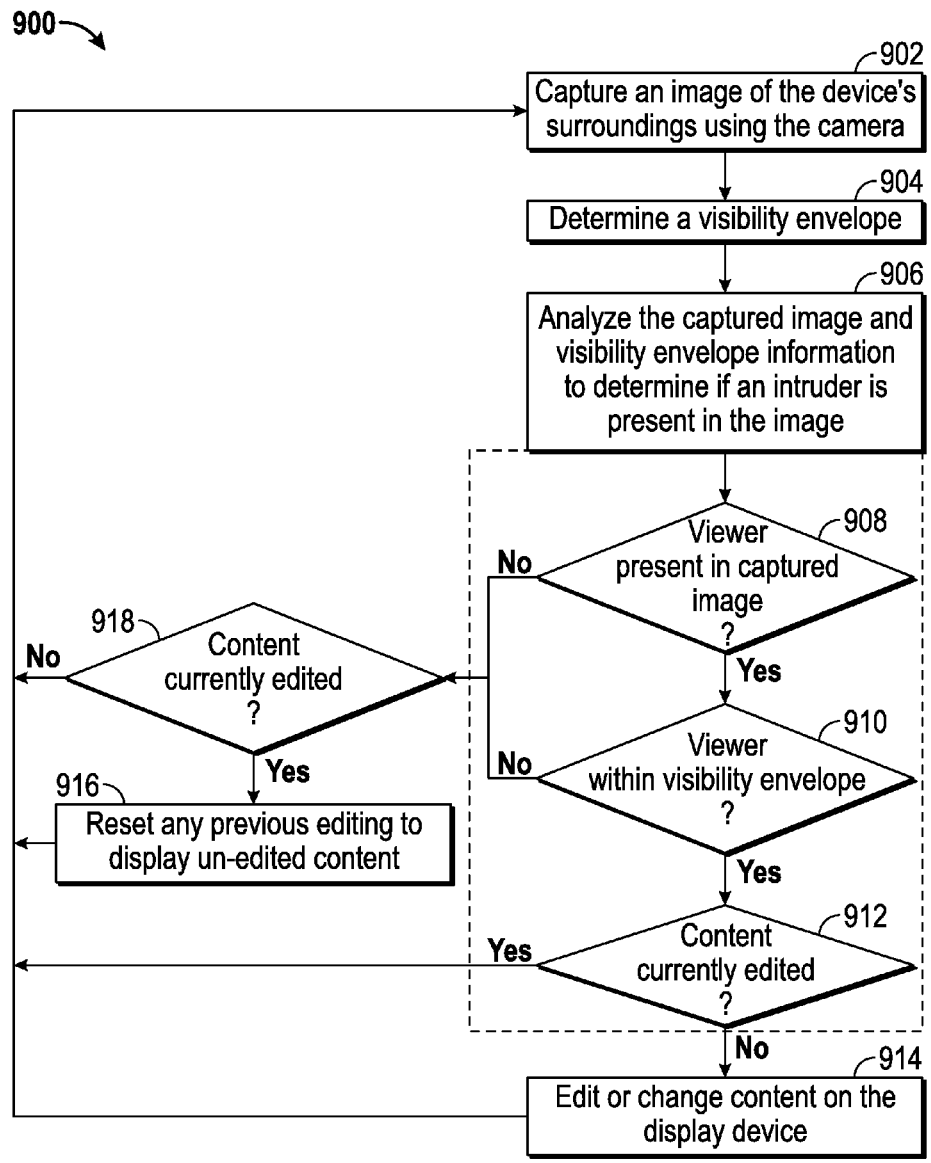
FIG. 9 is a flowchart of a process for detecting and reacting to an intruding viewer of an electronic media display device, shown according to an exemplary embodiment.

Referring to FIG. 9, a flow diagram of a process 900 for detecting an intruding viewer of a camera-equipped electronic media display device and editing content is shown, according to an exemplary embodiment. Process 900 includes capturing an image of the electronic media display device's surroundings using a camera (step 902), determining a visibility envelope (step 904), and analyzing the captured image and visibility envelope information to determine if an intruder is present (step 906). If a viewer is present (step 908), and the viewer is within the visibility envelope (step 910), and the content on the screen is not already edited (step 912), the content on the electronic media display device is edited or changed (step 914). However, if the viewer is not determined to be an intruder, and the content is already edited (step 918), it is safe to reset any previous edits and display unedited content again (step 916). If an intruder is detected and the content is already edited, no further action needs to be taken (step 912).

Figure 10:
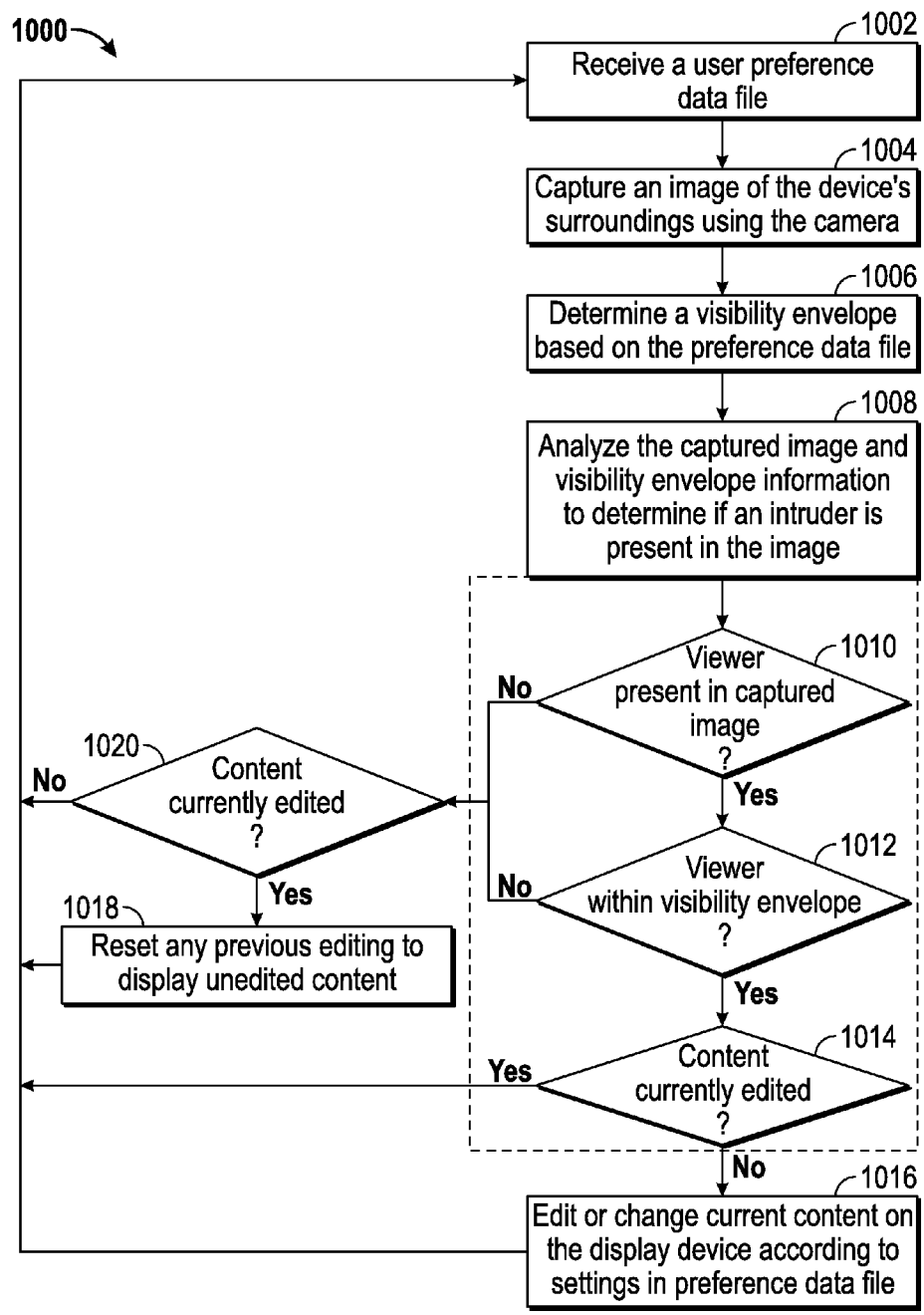
FIG. 10 is a flowchart of a process for detecting and reacting to an intruding viewer of an electronic media display device, shown according to an alternative embodiment.

Referring to FIG. 10, a flow diagram of a process 1000 for detecting an intruding viewer of camera-equipped electronic media display device and editing content according to a user preference file is shown, according to an exemplary embodiment. Process 1000 includes receiving a user preference data file (step 1002), capturing an image of the electronic media display device's surrounding using the camera (step 1004), determining a visibility envelope (step 1006), and analyzing the captured image and visibility envelope information to determine if an intruder is present (step 1008). If a viewer is present (step 1010), and the viewer is within the visibility envelope (step 1012), and the content on the screen is not already edited (step 1014), content on the electronic media display device is edited or changed (step 1016). However, if the viewer is not determined to be an intruder, and the content is already edited (step 1020), it is safe to reset any previous edits and display unedited content again (step 1018). If an intruder is detected and the content is already edited, no further action needs to be taken (step 1014).

Figure 11:
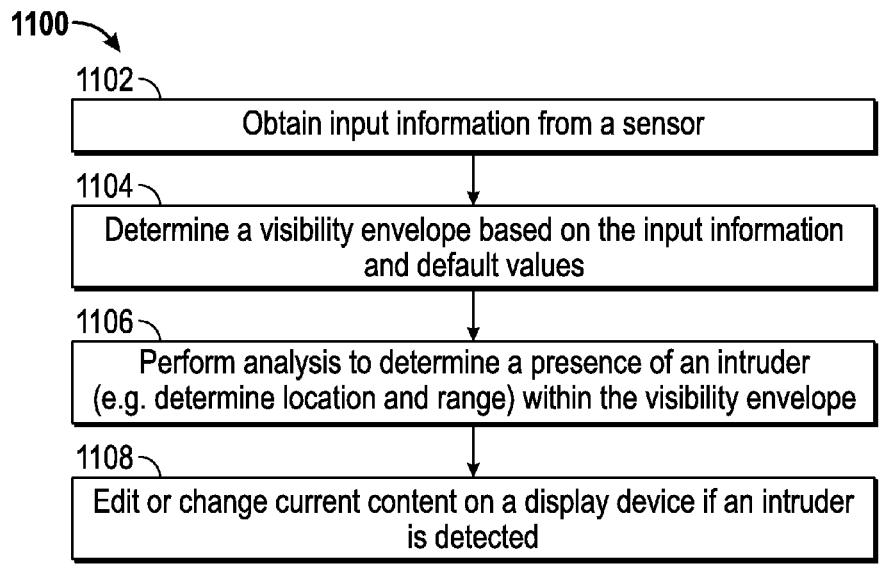
FIG. 11 is a flowchart of a general process for detecting and reacting to an intruding viewer of an electronic media display device, shown according to an exemplary embodiment.

Referring to FIG. 11, a flow diagram of a general process 1100 for detecting and reacting to an intruding viewer of an electronic media display device is shown according to an exemplary embodiment. Process 1100 includes obtaining information from a sensor (step 1102), determining a visibility envelope based on the sensor and input information (step 1104), performing analysis to determine a presence of an intruder within the visibility envelope (step 1106), and editing or changing content on a display device if an intruder is detected (step 1108).

Figure 12:
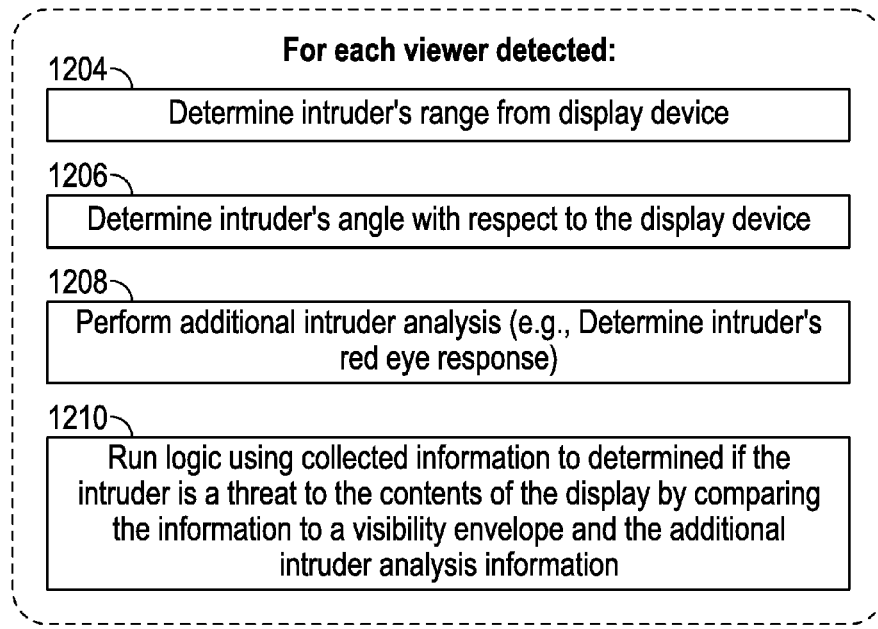
FIG. 12 is a flowchart of a process for performing analysis of intruding viewers of an electronic media display device, shown according to an exemplary embodiment.

Referring to FIG. 12, a flow diagram of a process 1200 for performing intruder analysis is shown, according to an exemplary embodiment. Process 1200 includes detecting all viewers of a display device (step 1202) and performing the following steps for each detected viewer: determining the viewers range from the display device (step 1204), determining the viewer's angle with respect to the display device (step 1206), performing additional analysis (step 1208), and comparing the analyzed information to a visibility envelope to determine if the viewer is an intruder and is a threat to the display device's content (step 1210). Step 1208 may include performing additional operations in addition to those performed in steps 1204 and 1206. For example, a system may be configured to perform red eye analysis to determine if a viewer can see the display. As another example, a system may be configured to adjust a visibility envelope according to user preferences. As another example, a system may be configured to take the display's brightness or content type into consideration. As another example, a system may be configured to take the display's size and the average quality of human eyesight into consideration.

Figure 13:
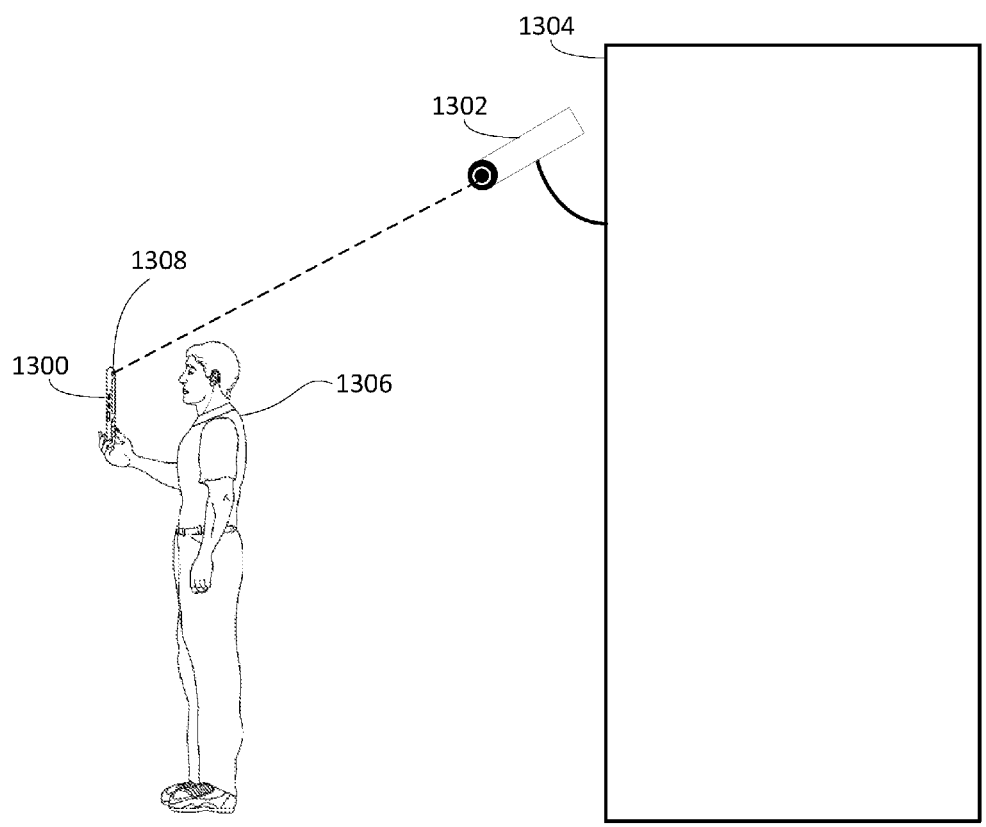
FIG. 13 is a schematic diagram of an electronic media display device and a camera, shown according to an alternative embodiment.

Referring to FIG. 13, a schematic diagram of shows electronic media display device 1300, intruding camera 1302 attached to building 1306, and user 1306. According to an exemplary embodiment, electronic media display device 1300 is a cellular phone equipped with a camera 1308 (e.g., electronic media display device 402 of FIG. 4), which is configured to scan for intruding cameras according to systems and methods described herein. The processing circuit of electronic media display device 1300 receives data from camera 1308 relating to the environment around electronic media display device 1300. The processing circuit (via the intruder analysis module) analyzes the information to determine the presence of intruding camera 1302. The processing circuit (via the edit generation module) edits or changes content on electronic media display device 1300 in response to detecting intruding camera 1302. For example, the processing circuit may blur the contents of the display or cause an alert to appear, thereby notifying user 1306 of the intrusion. In this manner, sensitive content can be protected from being captured by unauthorized cameras. It should be understood that the application is not limited to detecting cameras attached to buildings, and that other scenarios are envisioned. For example, electronic media display device 1300 may detect another cellular phone equipped with a camera. Similar embodiments are also useful in public locations or while a user is taking public transportation, where intruding cameras are likely to be present.

Figure 14:
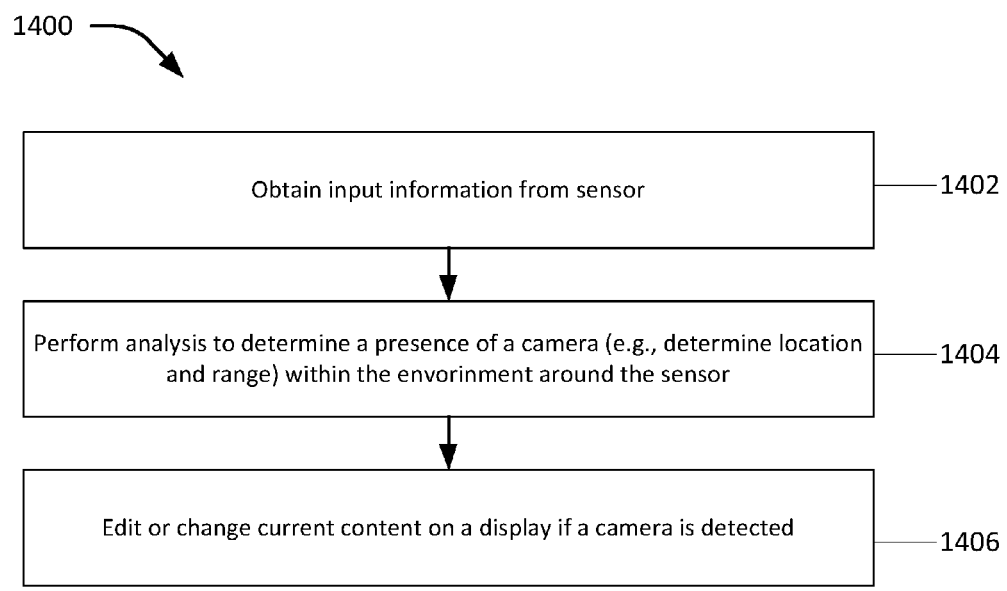
FIG. 14 is a flowchart of a general process for detecting and reacting to an intruding camera, shown according to an exemplary embodiment.

Referring to FIG. 14, a flow diagram of a general process 1400 for detecting and reacting to an intruding viewer of an electronic media display device is shown according to an exemplary embodiment. Process 1400 includes obtaining information from a sensor (step 1402), performing analysis to determine a presence of a camera within the environment around the sensor (e.g., within the data captured by the sensor) (step 1404), and editing or changing content on a display device if a camera is detected (step 1406).

Figure 15:
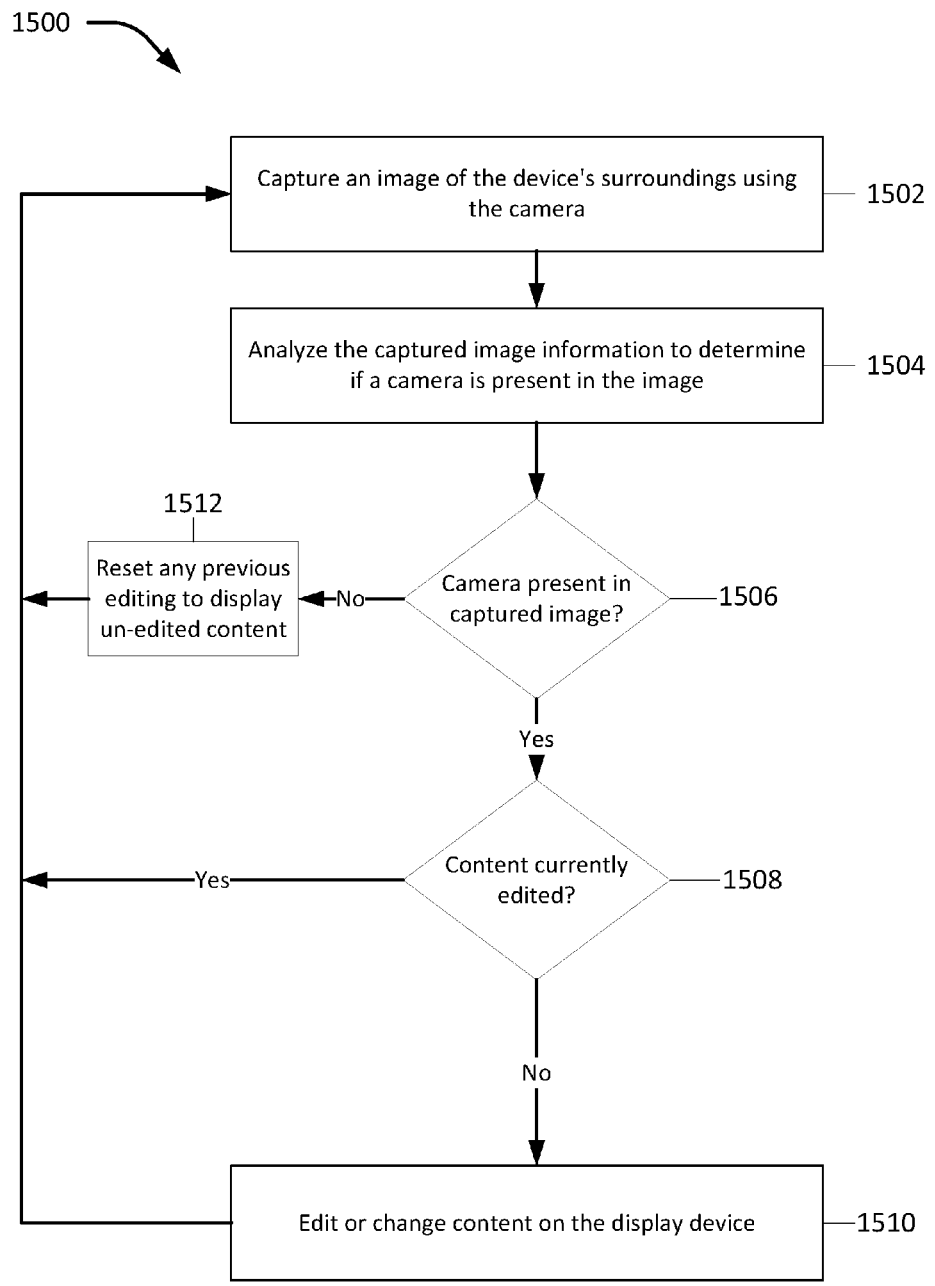
FIG. 15 is a flowchart of a process for detecting and reacting to an intruding camera, shown according to an exemplary embodiment.

Referring to FIG. 15, a flow diagram of a process 1500 for detecting an intruding camera of a camera-equipped electronic media display device and editing content is shown, according to an exemplary embodiment. Process 1500 includes capturing an image of the electronic media display device's surroundings using a camera (step 1502), and analyzing the captured image information to determine if a camera is present in the image (step 1504). If a camera is present in the captured image (step 1506), and the content on the screen is not already edited (step 1508), the content on the electronic media display device is edited or changed (step 1510). However, if there are no cameras present in the captured image, (step 1506), it is safe to reset any previous edits and display unedited content again (step 1512). If a camera is detected and the content is already edited, no further action needs to be taken (step 1508) and process 1500 may start again.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for detecting and responding to an intruding onlooker, comprising:
   a mobile device having a screen configured to display content;
   a sensor; and
   a processing circuit configured to:
   obtain information from the sensor;
   analyze the information to determine a presence of an onlooker, wherein the onlooker is a person or a camera, wherein analyzing the information includes accessing camera dimension information from a database including camera specification information; and
   edit any displayed content in response to the presence of the onlooker, wherein a different editing is applied based on whether the onlooker is a person or a camera.

2. The system of claim 1, wherein analyzing the information includes utilizing shape comparison algorithms.

3. The system of claim 1, wherein analyzing the information includes a determination of an orientation of the camera.

4. The system of claim 3, wherein the orientation of the camera comprises an angle between an imaging direction of the camera and a line of sight from the camera to the electronic media display device.

5. The system of claim 1, wherein analyzing the information includes detection of a lens cap of the camera.

6. The system of claim 1, wherein the processing circuit is further configured to determine a distance of the camera from the screen based on the information.

7. The system of claim 6, wherein the distance determination is based upon an angular size of at least a portion of the camera.

8. The system of claim 6, wherein the presence of the camera is determined using the distance.

9. The system of claim 1, wherein the processing circuit is further configured to determine an angle of the camera relative to an axis orthogonal to the screen based on the information.

10. The system of claim 9, wherein the presence of the camera is determined using the angle.

11. The system of claim 1, wherein the processing circuit is further configured to alert a user if the presence of a camera is determined.

12. The system of claim 11, wherein the alert includes at least one of playing a sound, displaying a flashing content on a portion of the screen, a vibration, a change to a color of a portion of content displayed on the screen, and displaying a message on the screen.

13. The system of claim 1, wherein the editing comprises turning off the screen.

14. The system of claim 1, wherein the editing comprises replacing the displayed content with a different content.

15. The system of claim 1, wherein the editing comprises adjusting a brightness of the screen.

16. The system of claim 1, wherein the editing comprises muting any audio.

17. The system of claim 1, wherein the editing comprises degrading the displayed content.

18. The system of claim 1, wherein the processing circuit is further configured to distinguish the camera from an authorized device.

19. The system of claim 1, wherein the processing circuit is further configured to determine a visibility envelope of the electronic media display device, and wherein analyzing the information to determine the presence visibility envelope.

20. The system of claim 19, wherein the visibility envelope is determined using at least one of a brightness of the screen, externally provided information characterizing a visual performance of the screen, information concerning the displayed content, an ability to resolve displayed content.

21. A method of detecting and responding to an intruding camera, comprising:
   displaying content on a mobile device having a screen;
   obtaining information from a sensor;
   analyzing the information to determine a presence of an onlooker, wherein the onlooker is a person or a camera; and
   editing any displayed content in response to the presence of the onlooker to prevent content from being recognized by the onlooker, wherein a different editing is applied based on whether the onlooker is a person or a camera.

22. The method of claim 21, wherein analyzing the information includes utilizing shape comparison algorithms.

23. The method of claim 21, wherein analyzing the information includes accessing camera dimension information from a database.

24. The method of claim 21, wherein analyzing the information includes a determination of an orientation of the camera.

25. The method of claim 24, wherein the orientation of the camera comprises an angle between an imaging direction of the camera and a line of sight from the camera to the electronic media display device.

26. The method of claim 21, wherein analyzing the information includes detection of a lens cap of the camera.

27. The method of claim 21, further comprising determining a distance of the camera from the screen based on the information.

28. The method of claim 27, wherein the distance determination is based upon an angular size of at least a portion of the camera.

29. The method of claim 21, further comprising determining an angle of the camera relative to an axis orthogonal to the screen based on the information, and wherein the presence of the camera is determined using the angle.

30. The method of claim 21, further comprising alerting a user if the presence of a camera is determined.

31. The method of claim 21, further comprising determining a visibility envelope of the electronic media display device, and wherein analyzing the information to determine the presence of the camera depends on the visibility envelope.

32. The method of claim 31, wherein the visibility envelope is determined using a brightness of the screen.

33. The method of claim 31, wherein the visibility envelope is determined using externally provided information characterizing a visual performance of the screen.

34. The method of claim 31, wherein the visibility envelope is determined using information concerning the displayed content.

35. The method of claim 31, wherein the visibility envelope is based upon an ability to resolve displayed content.

36. A non-transitory computer-readable medium having instructions stored thereon for execution by a processing circuit, the instructions comprising:
   instructions for interfacing with a mobile device having a screen for visual content;
   instructions for obtaining information from a sensor, wherein the information corresponds to the environment around the electronic media display device;
   instructions for analyzing the information to determine a presence of an onlooker, wherein the onlooker is a camera or a person;
   instructions for determining a visibility envelope of the electronic media display device, wherein analyzing the information to determine the presence of the person depends on the visibility envelope, and wherein analyzing the information to determine the presence of the camera does not depend on the visibility envelope; and
   instructions for editing any displayed content in response to the presence of the onlooker, wherein a different editing is applied based on whether the person is a camera or a person.

37. The non-transitory computer-readable medium of claim 36, wherein the instructions for analyzing the information include instructions to utilize shape comparison algorithms.

38. The non-transitory computer-readable medium of claim 36, wherein the instructions for analyzing the information include instructions to access camera dimension information from a database.

39. The non-transitory computer-readable medium of claim 36, wherein the instructions for analyzing the information include instructions to determine an orientation of the camera.

40. The non-transitory computer-readable medium of claim 39, wherein the orientation of the camera comprises an angle between an imaging direction of the camera and a line of sight from the camera to the electronic media display device.

41. The non-transitory computer-readable medium of claim 36, wherein the instructions for analyzing the information include instructions to detect a lens cap of the camera.

42. The non-transitory computer-readable medium of claim 36, further comprising instructions for determining a distance of the camera from the screen based on the information.

43. The non-transitory computer-readable medium of claim 36, further comprising instructions for determining an angle of the camera relative to an axis orthogonal to the screen based on the information.

44. The non-transitory computer-readable medium of claim 43, wherein the presence of the camera is determined using the angle.

45. The non-transitory computer-readable medium of claim 36, further comprising instructions for distinguishing the camera from an authorized device.

46. The non-transitory computer-readable medium of claim 36 wherein analyzing the information to determine the presence of the camera depends on the visibility envelope.

* * * * *